(12) United States Patent
Ike

(10) Patent No.: US 7,231,506 B2
(45) Date of Patent: Jun. 12, 2007

(54) MICROPROCESSOR

(75) Inventor: Atsushi Ike, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 244 days.

(21) Appl. No.: 10/776,266

(22) Filed: Feb. 12, 2004

(65) Prior Publication Data
US 2004/0221090 A1 Nov. 4, 2004

(30) Foreign Application Priority Data
Apr. 30, 2003 (JP) .............................. 2003-124937

(51) Int. Cl.
*G06F 12/12* (2006.01)
(52) U.S. Cl. ..................................... 711/207
(58) Field of Classification Search ................ 711/3, 711/125, 133, 136, 206, 207
See application file for complete search history.

(56) References Cited

U.S. PATENT DOCUMENTS

| 4,373,179 A * | 2/1983 | Katsumata | 711/207 |
| 4,463,420 A * | 7/1984 | Fletcher | 711/133 |
| 4,682,281 A * | 7/1987 | Woffinden et al. | 711/207 |
| 4,731,739 A * | 3/1988 | Woffinden et al. | 711/206 |
| 4,797,814 A * | 1/1989 | Brenza | 711/3 |
| 4,980,816 A * | 12/1990 | Fukuzawa et al. | 711/207 |
| 5,511,178 A * | 4/1996 | Takeda et al. | 711/125 |
| 5,623,619 A * | 4/1997 | Witt | 711/3 |
| 5,644,748 A * | 7/1997 | Utsunomiya et al. | 711/207 |
| 5,737,752 A * | 4/1998 | Hilditch | 711/133 |
| 6,292,871 B1 * | 9/2001 | Fuente | 711/136 |
| 6,862,663 B1 * | 3/2005 | Bateman | 711/133 |

FOREIGN PATENT DOCUMENTS

JP 4-338848 11/1992

* cited by examiner

*Primary Examiner*—Pierre Bataille
*Assistant Examiner*—Paul Schlie
(74) *Attorney, Agent, or Firm*—Staas & Halsey LLP

(57) ABSTRACT

A translation lookaside buffer has a plurality of entries in which address translation information obtained by translating a virtual address into a physical address is registered. The entries each have a priority bit that is set when the registered address translation information is required to be resident. At the time an entry substitution request occurs while the priority bits of all the entries are in a set state, a control circuit for controlling the translation lookaside buffer chooses as a subject of substitution an entry that has been least recently referred to, irrespective of states of the priority bits. This allows execution of the entry substitution with the priority bits in all of the entries being set.

6 Claims, 8 Drawing Sheets

MICROPROCESSOR

CROSS-REFERENCE TO RELATED APPLICATIONS

This application is based upon and claims the benefit of priority from Japanese Patent Application No. 2003-124937, filed on Apr. 30, 2003, the entire contents of which are incorporated herein by reference.

BACKGROUND OF THE INVENTION

1. Field of the Invention

The present invention relates to a microprocessor, and more particularly to a microprocessor having a translation lookaside buffer (TLB).

2. Description of the Related Art

In a virtual memory computer, it is necessary to translate a virtual address into a physical address (address translation) during program execution. A hardware mechanism for the address translation is called a dynamic address translator (DAT). The DAT refers to an address translation table (a table constituted of a segment table, a page table, and so on) to execute the address translation. The address translation table is in a main memory and managed by an operating system (OS). The address translation table shows, for example, which virtual page number corresponds to which physical page number.

If the DAT refers to the address translation table for every address translation, overhead for the address translation substantially increases. Therefore, in a general practice, previously used address translation information (a pair of the virtual page number and the physical page number) is registered in a high-speed memory with locality of the address reference taken into consideration. This memory is called a translation lookaside buffer (TLB) or an address translation buffer. The TLB has a plurality of entries in which the address translation information is registered.

If there is no address translation information corresponding to a virtual address in the TLB at the time the address translation is executed, it is necessary to substitute address translation information obtained by address translation using the address translation table for the address translation information registered in any one of the entries. In other words, the entry substitution is required to be executed. An entry to be substituted is chosen according to LRU (Least Recently Used) algorithm, for example. Specifically, an entry that was referred to least recently is chosen as a subject of substitution with locality of the address reference taken into consideration.

However, for example, in a case a frequently used program is executed after a less frequently used program in a time-slice OS, one entry substitution request made during the less frequently used program leads to occurrence of a lot of the entry substitution requests during the frequently used program. Therefore, the advantages of the TLB cannot be exerted.

In order to solve this problem, Japanese Unexamined Patent Application Publication No. Hei 4-338848, for example, proposes a TLB having a function of prohibiting the entry substitution (entry lock). In this kind of TLB, each entry has a substitution prohibition bit. The substitution prohibition bit is set in an entry having registered therein address translation information used for a frequently used program (such as a program needed to have a realtime property), i.e., information required to be resident in the TLB. The entry having the set substitution prohibition bit is excluded from candidates for the entry substitution.

SUMMARY OF THE INVENTION

It is an object of the present invention to prevent a situation where entry substitution is not executable in a microprocessor having a TLB, without complexing the circuit configuration.

According to one of the aspects of the microprocessor of the present invention, a translation lookaside buffer has a plurality of entries in which address translation information obtained by translating a virtual address into a physical address is registered. The entries each have a priority bit that is set when the registered address translation information is required to be resident. At the time an entry substitution request occurs while the priority bits of all the entries are in a set state, a control circuit for controlling the translation lookaside buffer chooses as a subject of substitution an entry that has been least recently referred to, irrespective of states of the priority bits.

The entry substitution can be executed even when the priority bits of all the entries are in the set state, which can prevent the situation where the entry substitution is not executable, and a stop of program operation. In other words, normal system operation can be ensured.

Further, since the entry that has been least recently referred to is chosen as a subject of substitution irrespective of the states of the priority bits, it is possible to substantially reduce overhead for the address translation occurring with the entry substitution.

Moreover, choosing a subject of the entry substitution with reference to the priority bits makes it possible to prevent a situation where the entry substitution is not executable, without complexing the circuit configuration.

According to another aspect of the microprocessor of the present invention, at the time an entry substitution request occurs while the priority bit in one of the entries is in a reset state, the control circuit chooses as a subject of substitution an entry having a priority bit being in the reset state. At the time an entry substitution request occurs while the priority bits in the plurality of entries are in the reset state, the control circuit chooses as the subject of substitution the entry that has been least recently referred to from the plurality of entries having priority bits being in the reset state.

The entry having the priority bit being in the set state is excluded from candidates for the entry substitution, so that the address translation information that should be resident can be resident in the translation lookaside buffer. Therefore, the overhead for the address translation can be reduced.

Further, the entry that has been least recently referred to is chosen as the subject of substitution from at least one of the entries having the priority bits being in the reset state. This can substantially reduce the overhead for the address translation occurring with the entry substitution.

According to another aspect of the microprocessor of the present invention, the microprocessor adopts a VLIW method in which a plurality of instructions contained in one VLIW instruction are executed in parallel. The translation lookaside buffer adopts a 2-way set associative method. A detection circuit detects an occurrence of continuous entry substitution requests under one VLIW instruction. When the detection circuit detects the occurrence of continuous entry substitution requests under one VLIW instruction, the control circuit chooses as the subject of substitution an entry that has been previously referred to, irrespective of the states of the priority bits.

The entry substitution is executable even when continuous entry substitution requests occur under the same VLIW instruction. Therefore, it is possible to prevent a situation where the entry substitution is not executable even in the VLIW microprocessor having the 2-way set associative translation lookaside buffer and to avoid a stop of the program operation. In other words, normal system operation can be ensured.

According to another aspect of the microprocessor of the present invention, the detection circuit has a holding circuit, a comparator, and a flag. The holding circuit holds a storage address of a VLIW instruction corresponding to the most previous entry substitution. The comparator compares the storage address of the VLIW instruction corresponding to the most previous entry substitution and the address held in the holding circuit. The flag is set when the comparator detects a match of the two addresses. The control circuit chooses as the subject of substitution an entry that have been previously referred to, irrespective of the states of the priority bits, while the flag is in a set state.

The flag is set according to the address comparison result from the comparator, so that it is possible to judge whether or not continuous entry substitution requests have occurred under the same VLIW instruction only by referring to the flag. This means that the provision of the flag makes it easier to determine whether or not the continuous entry substitution requests have occurred under the same VLIW instruction.

According to another aspect of the microprocessor of the present invention, the flag is reset in response to a transition of the storage address of the VLIW instruction. Resetting the flag can re-validate the priority bits.

According to another aspect of the microprocessor of the present invention, the detection circuit includes an address detector to detect a transition of the storage address of the VLIW instruction. The flag is reset when the address detector detects the transition of the storage address of the VLIW instruction. The provision of the address detector makes it easier to reset the flag.

According to another aspect of the microprocessor of the present invention, an interrupt controller manages a plurality of interrupt requests which are issued for interrupting execution of a program. The flag is reset in response to the interrupt controller's acceptance of an interrupt request being not an interrupt request for the entry substitution. The resetting of the flag can re-validate the priority bits.

According to another aspect of the microprocessor of the present invention, the interrupt controller includes an interrupt determining circuit to determine a factor of the accepted interrupt request. The flag is reset when the interrupt determining circuit determines that the accepted interrupt request is not the interrupt request for the entry substitution. The provision of the interrupt determining circuit makes it easier to reset the flag.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

The present invention will solve the following problems.

In a TLB having the entry lock function as described above, the entry substitution is not executable in response to an issuance of an entry substitution request if the substitution prohibition bits of all the entries are in a set state. This stops the operation of a program. In other words, the system is not able to normally operate.

Further, in case that there are two TLBs for entry lock and for non-entry lock, both of the TLBs have to be searched synchronously for the address translation. An increase in the number of ports (multiple ports) or the like is necessary for the synchronous access to both of the TLBs, which complicates circuit configuration, and accordingly enlarges the circuit scale.

Moreover, for example, in a VLIW (Very Long Instruction Word) microprocessor having a 2-way set associative TLB, if continuous entry substitution requests occur under a single VLIW instruction in the TLB, the entry substitution may be not executable when even one substitution prohibition bit of entries in the two ways is not set.

Hereinafter, embodiments will be explained, using the drawings.

Figure 1:
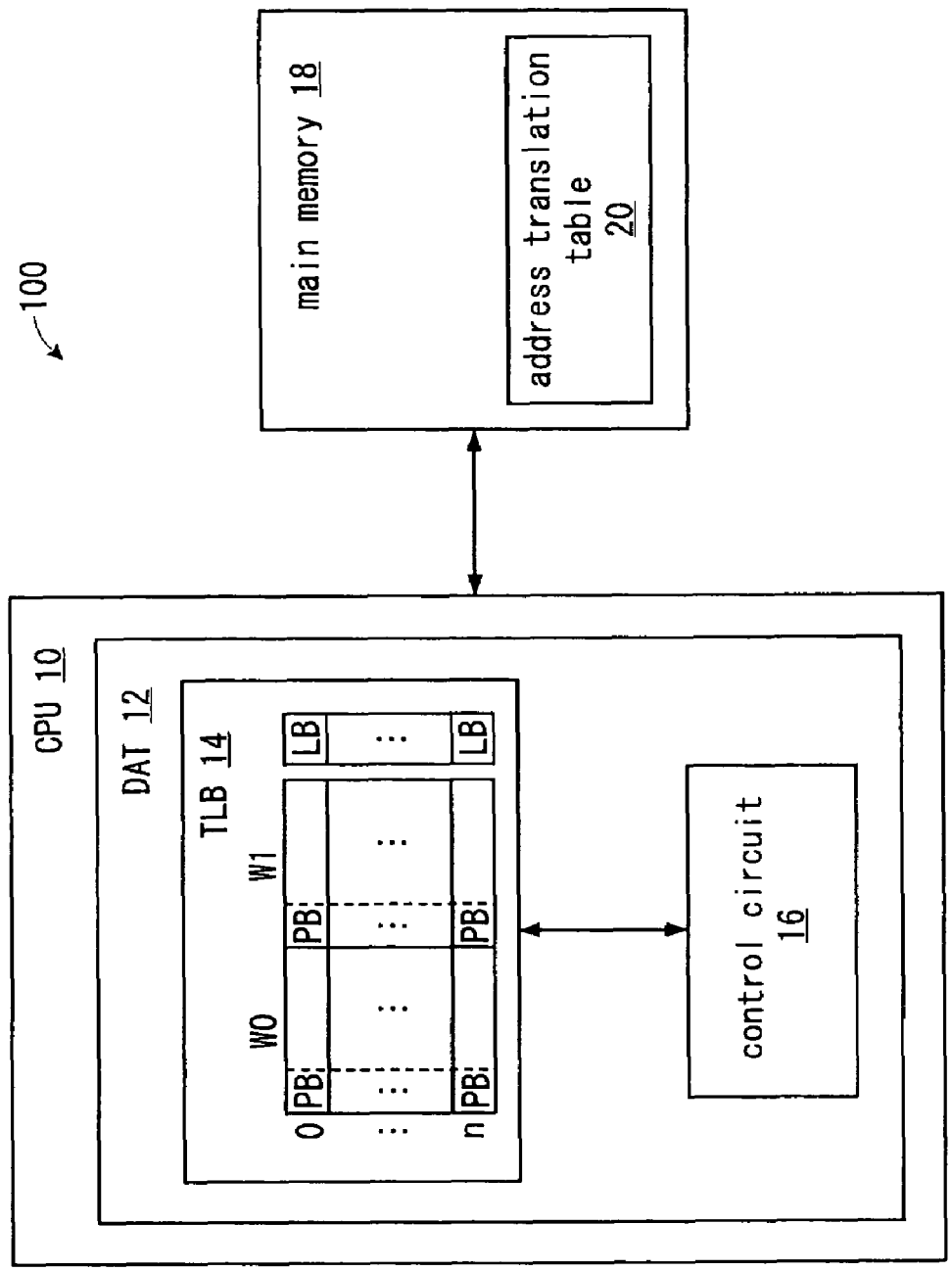
FIG. 1 is a block diagram showing a first embodiment of a microprocessor of the present invention.

FIG. 1 shows a first embodiment of a microprocessor of the present invention. Note that FIG. 1 shows a part of the microprocessor related to address translation.

A microprocessor 100 adopts a virtual memory method and has a CPU 10 and a main memory 18. The CPU 10 has a DAT (Dynamic Address Translator) 12 and it operates according to programs in the main memory 18. The DAT 12 is a hardware mechanism for translating a virtual address into a physical address (address translation) during program execution, and it has a TLB (Translation Lookaside Buffer) 14 and a control circuit 16.

The TLB 14 is constituted as an associative memory of a 2-way set associative method (the number of sets: n). Each of ways W0, W1 of the TLB 14 has n entries in which address translation information obtained by the address translation is registered. The entries each have a priority bit PB. The priority bit PB is set to "1" when the address translation information registered therein should be resident (when the priority degree is high), while being reset to "0" when the address translation information registered therein is relatively little required to be resident (when the priority degree is low).

The TLB 14 has a LRU bit LB for each set. The LRU bit LB is set to "1" when the entry of the way W0 is referred to in the corresponding set, while being reset to "0" when the entry of the way W1 is referred to in the corresponding set.

At the occurrence of the entry substitution request (for substituting the registered information in the entry), when the priority bit PB of the entry of the way W0 and the priority bit PB of the entry of the way W1 are both "1" in the set corresponding to the virtual address (case 1), the control circuit 16 disregards the priority bits PB and chooses the entry less recently referred to as a subject of substitution. Here, the entry substitution request, in which the address information obtained by the address translation using an address translation table 20 is substituted for the address translation information registered in any one of the entries in the set corresponding to the virtual address, occurs when there is no address translation information corresponding to the virtual address in the TLB 14.

At the occurrence of the entry substitution request, when either one of the priority bit PB of the entry of the way W0 and the priority bit PB of the entry of the way W1 is "0" in the set corresponding to the virtual address (case 2), the control circuit 16 chooses the entry where the priority bit is "0" as the subject of substitution.

At the occurrence of the entry substitution request, when the priority bit PB of the entry of the way W0 and the priority bit PB of the entry of the way W1 are both "0" in the set corresponding to the virtual address (case 3), the control circuit 16 chooses, as the subject of substitution, the entry less recently referred to.

The control circuit 16 chooses the subject of substitution according to, for example, LRU algorithm. Specifically, when the LRU bit LB of the set corresponding to the virtual address is "1" in the case 1 or the case 3, the control circuit 16 chooses the entry of the way W1 as the subject of substitution. When the LRU bit LB of the set corresponding to the virtual address is "0" in the case 1 or the case 3, the control circuit 16 chooses the entry of the way W0 as the subject of substitution.

The main memory 18 has the address translation table 20 stored therein together with various kinds of programs, data, and so on. The address translation table 20 is a known table constituted of a segment table, a page table, and so on.

Here, TLB control in the first embodiment will be explained.

Figure 2:
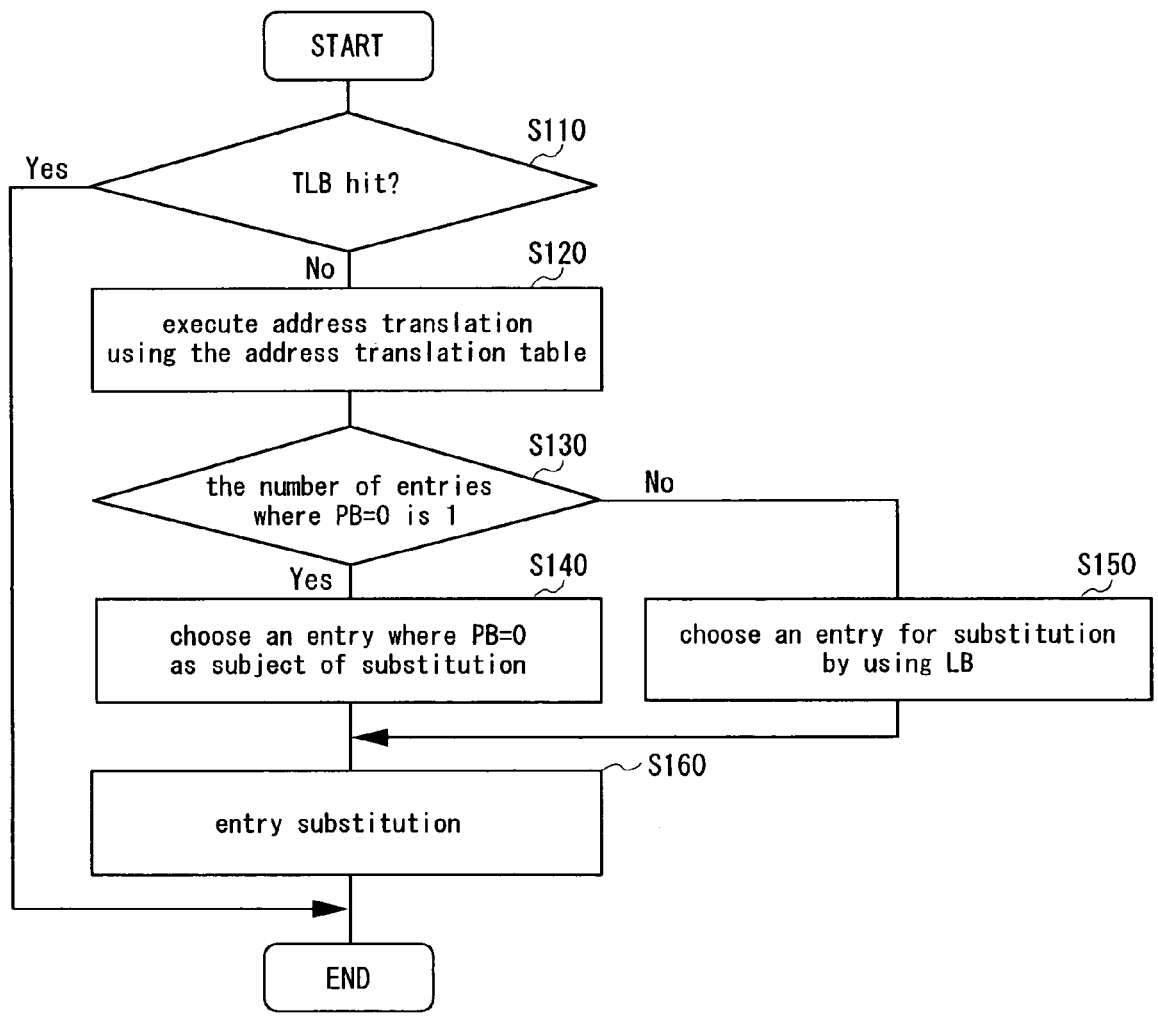
FIG. 2 is a flowchart showing TLB control in the first embodiment.

FIG. 2 shows the TLB control in the first embodiment. The TLB control described below is executed by the CPU 10 operating according to the programs (operating system) in the main memory 18.

In Step S110, the CPU 10 judges whether or not there is address translation information corresponding to the virtual address in the TLB 14. If positive (TLB hit), in other words, no entry substitution request occurs, the TLB control is finished. If negative (TLB miss), in other words, the entry substitution request occurs, the TLB control shifts to Step S120.

In Step S120, the CPU 10 refers to the address translation table 20 in the main memory 18 to translate the virtual address into a physical address. Thereafter, the TLB control shifts to Step S130.

In Step S130, the CPU 10 judges whether or not the number of entries where the priority bit PB is "0" is one in the set corresponding to the virtual address. When the number of entries where the priority bit PB is "0" is one, the TLB control shifts to Step S140. When the priority bits PB of all the entries are "0", or when the priority bits PB of all the entries are "1", the TLB control shifts to Step S150.

In Step S140, the control circuit 16 chooses, as the subject of substitution, the entry where the priority bit PB is "0" in the set corresponding to the virtual address. The entry where the priority bit PB is "1" is not chosen as the subject of substitution, so that the address translation information that should be resident is not cleared from the TLB 14. This reduces the overhead for the address translation. Thereafter, the TLB control shifts to Step S160.

In Step S150, through the use of the LRU bit LB (based on the LRU algorithm), the control circuit 16 chooses, as the subject of substitution, the entry less recently referred to in the set corresponding to the virtual address, irrespective of the state of priority bit PB. The subject of substitution is chosen even when the priority bits PB of all the entries are "1", which prevents a situation in which the entry substitution is not executable. The entry less recently referred to is chosen as the subject of substitution irrespective of the state of the priority bit PB, which suppresses an increase in overhead for the address translation occurring with the entry substitution. Thereafter, the TLB control shifts to Step S160.

In Step S160, the CPU 10 clears out the registered address translation information in the entry as the subject of substitution chosen in Step S140 or Step S150, and registers the address translation information obtained in Step S120. In this way the entry substitution is executed. Further, the priority bit PB in the entry as the subject of substitution is set to "1" when the address translation information registered therein is designated by the address translation table 20 as the one that should be resident. The priority bit PB in the entry as the subject of substitution is reset to "0" when the address translation information registered therein is not designated by the address translation table 20 as the one that should be resident. Further, the LRU bit LB of the set corresponding to the virtual address is set to "1" when the subject of substitution is the entry of the way W0. The LRU bit LB of the set corresponding to the virtual address is reset to "0", when the subject of substitution is the entry of the way W1. With this operation, the TLB control is completed.

The following effects are obtainable in the above-described first embodiment.

The entry substitution can be executed even when the priority bits PB of all the entries are "1". Therefore, it is possible to prevent a situation where the entry substitution is not executable and to avoid stopping of the program execution. In other words, normal system operation can be ensured.

The entry that is least recently referred to is chosen as the subject of substitution, which can suppress an increase in overhead for the address translation occurring with the entry substitution.

The subject of substitution is chosen with reference to the priority bit PB, which can prevent the situation where the entry substitution is not executable, without complexing the circuit configuration.

The entry where the priority bit PB is "1" is excluded from the candidates for the entry substitution, so that the address translation information that should be resident can be resident in the TLB 14. This can reduce overhead for the address translation.

Figure 3:
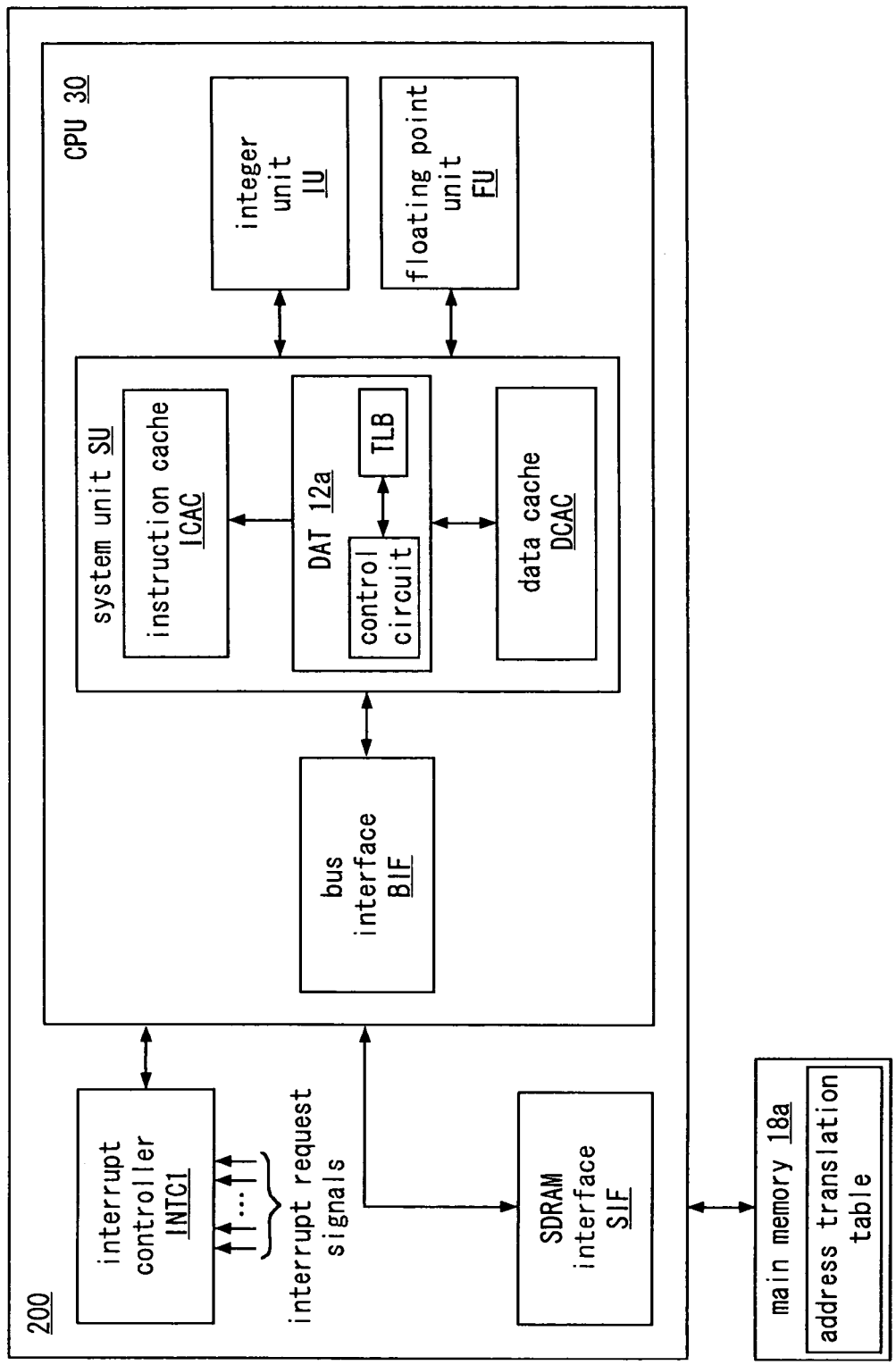
FIG. 3 is a block diagram showing a second embodiment of the microprocessor of the present invention.

FIG. 3 shows a second embodiment of the microprocessor of the present invention.

A microprocessor 200 adopts a VLIW method in which a plurality of instructions disposed in one VLIW instruction are executed in parallel. The microprocessor 200 has a CPU 30, an interrupt controller INTC1, and a SDRAM interface SIF.

The CPU 30 has a bus interface BIF, a system unit SU, an integer unit IU, and a floating point unit FU. The bus interface BIF operates as an interface between the CPU 30 and peripheral circuits in the microprocessor 200.

The system unit SU has a DAT 12a, an instruction cache ICAC, and a data cache DCAC.

The DAT 12a has a TLB and a control circuit similar to the TLB 14 and the control circuit 16 of the first embodiment. The instruction cache ICAC and the data cache DCAC, each being constituted of a tag region and a data region, are memories to be accessed at the TLB hit.

The integer unit IU executes an integer instruction for general processing. The floating point unit FU executes a floating point instruction for media processing on images and sounds.

The interrupt controller INTC1 manages a plurality of interrupt requests generated for interrupting program execution. The SDRAM interface SIF operates as an interface with a main memory 18a constituted of a SDRAM. The main memory 18a has an address translation table stored therein, similar to the address translation table 20 of the first embodiment.

Figure 4:
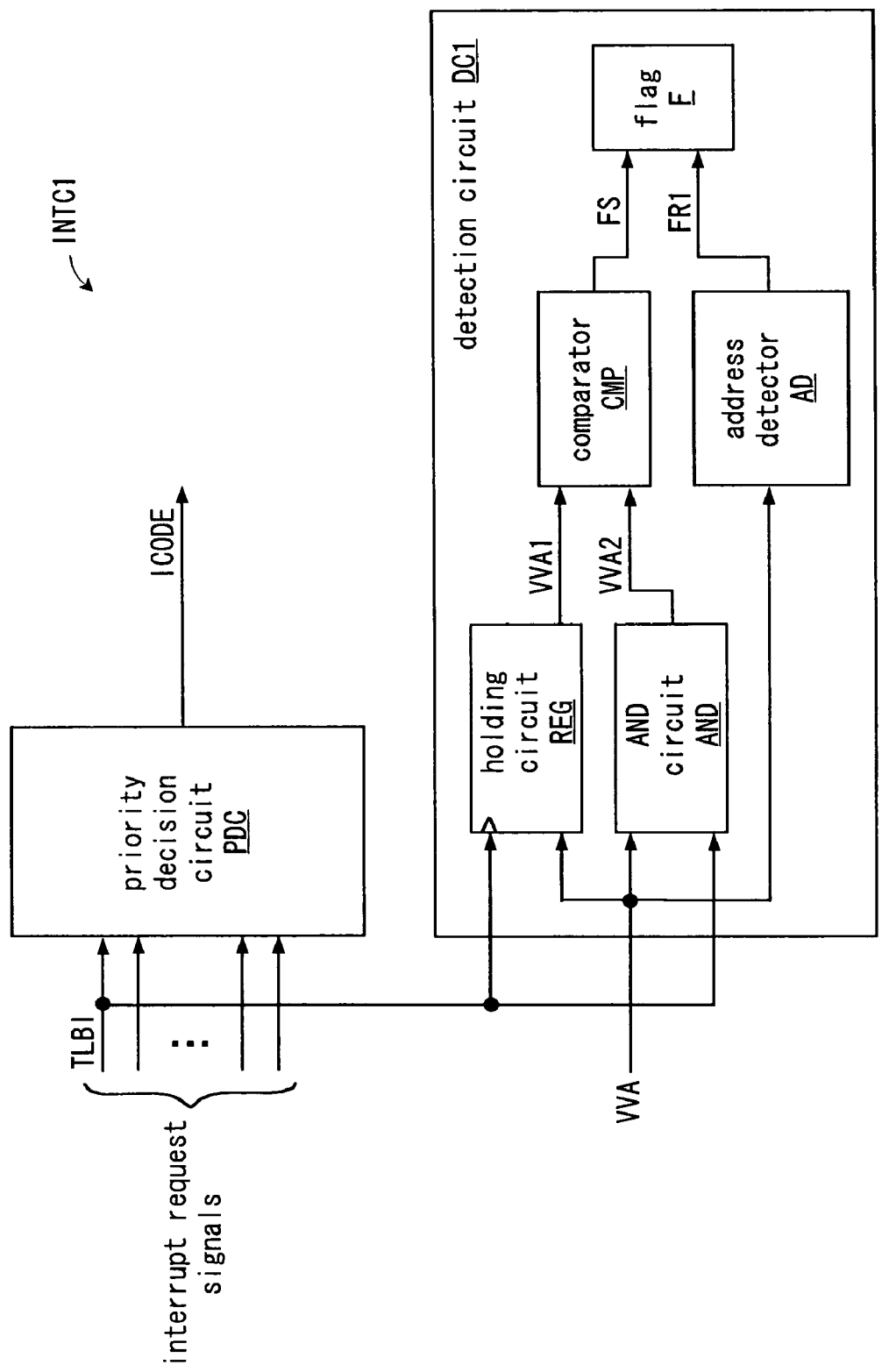
FIG. 4 is a block diagram showing an essential portion of an interrupt controller in the second embodiment.

FIG. 4 shows an essential portion of the interrupt controller INTC1 in the second embodiment.

The interrupt controller INTC1 has a priority decision circuit PDC and a detection circuit DC1. The priority decision circuit PDC accepts an activated interrupt request signal, using preset priority and mask information, and generates an interrupt code ICODE corresponding to the accepted interrupt request signal. The detection circuit DC1 has a holding circuit REG, an AND circuit AND, a comparator COMP, an address detector AD, and a flag F.

The holding circuit REG is constituted as, for example, a latch circuit, and it fetches a VLIW virtual address (a storage address of a VLIW instruction) WA in response to the deactivation of the interrupt request signal TLBI indicating a TLB miss interrupt request (an interrupt request for entry substitution). Therefore, the holding circuit REG holds the VLIW virtual address at the last TLB miss (at the occurrence of the entry substitution request). The holding circuit REG outputs the held address VVA1.

The AND circuit AND outputs the VLIW virtual address WA as an address WA2 during the activation of the interrupt request signal TLBI. The comparator CMP compares the address WA1 and the address W2. The comparator CMP, when detecting the address match, outputs a flag set signal FS which is a one-shot pulse signal. The address detector AD detects the transition of the VLIW virtual address WA. The address detector AD, when detecting the transition of the VLIW virtual address WA, outputs a flag reset signal FR1 which is a one-shot pulse signal.

The flag F is set to "1" in accordance with a rising edge of the flag set signal FS outputted from the comparator CMP. The flag F is reset to "0" in accordance with a rising edge of the flag reset signal FR1 outputted from the address detector AD. This makes it possible to easily identify the occurrence of the continuous entry substitution request under the same VLIW instruction only by referring to the flag F.

Figure 5:
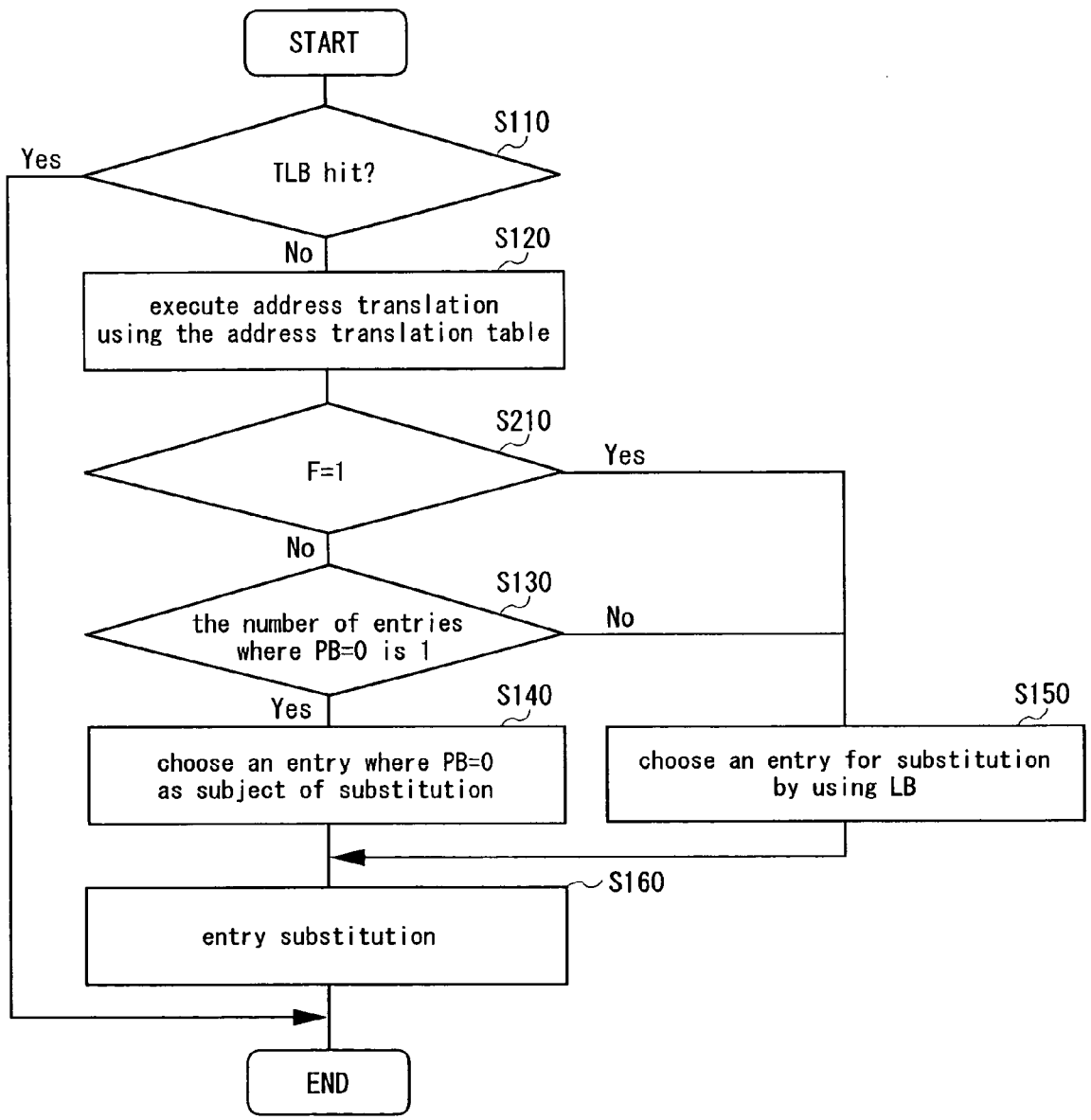
FIG. 5 is a flowchart showing TLB control in the second embodiment.

FIG. 5 is TLB control in the second embodiment.

The TLB control described below is executed by the CPU 30 operating according to programs (operating system) in the main memory 18a, as in the first embodiment. Note that the same reference numerals and symbols are used to designate the same processings as the processings explained in FIG. 2.

First, processings in Step S110 and Step S120 are executed in sequence as in the first embodiment.

In Step S210, the CPU 30 judges whether or not the flag F of the detection circuit DC1 is "1". When the flag F is "1", the TLB control shifts to Step S150. Then, processings in and after Step S150 are executed in sequence as in the first embodiment. When the flag F is "0", the TLB control shifts to Step S130. Then, the processings in and after Step S130 are executed in sequence as in the first embodiment.

In the second embodiment described above, the same effects as those of the first embodiment are also obtainable. Further, the entry substitution is executable even when the continuous entry substitution requests occur under the same VLIW instruction. Therefore, in the VLIW microprocessor 200 having the 2-way set associative TLB 14, it is also able to prevent a situation where the entry substitution is not executable and to avoid stopping of the program execution. In other words, normal system operation can be ensured.

The flag F is set in accordance with the address comparison result from the comparator CMP, so that only by referring to the flag F makes it possible to judge whether or not the continuous entry substitution requests have occurred under the same VLIW instruction. In other words, the provision of the flag F can make it easier to identify whether or not the entry substitution requests have occurred continuously under the same VLIW instruction.

The resetting of the flag F can re-validate a priority bit PB effective. The provision of the address detector AD can facilitate the resetting of the flag F.

Figure 6:
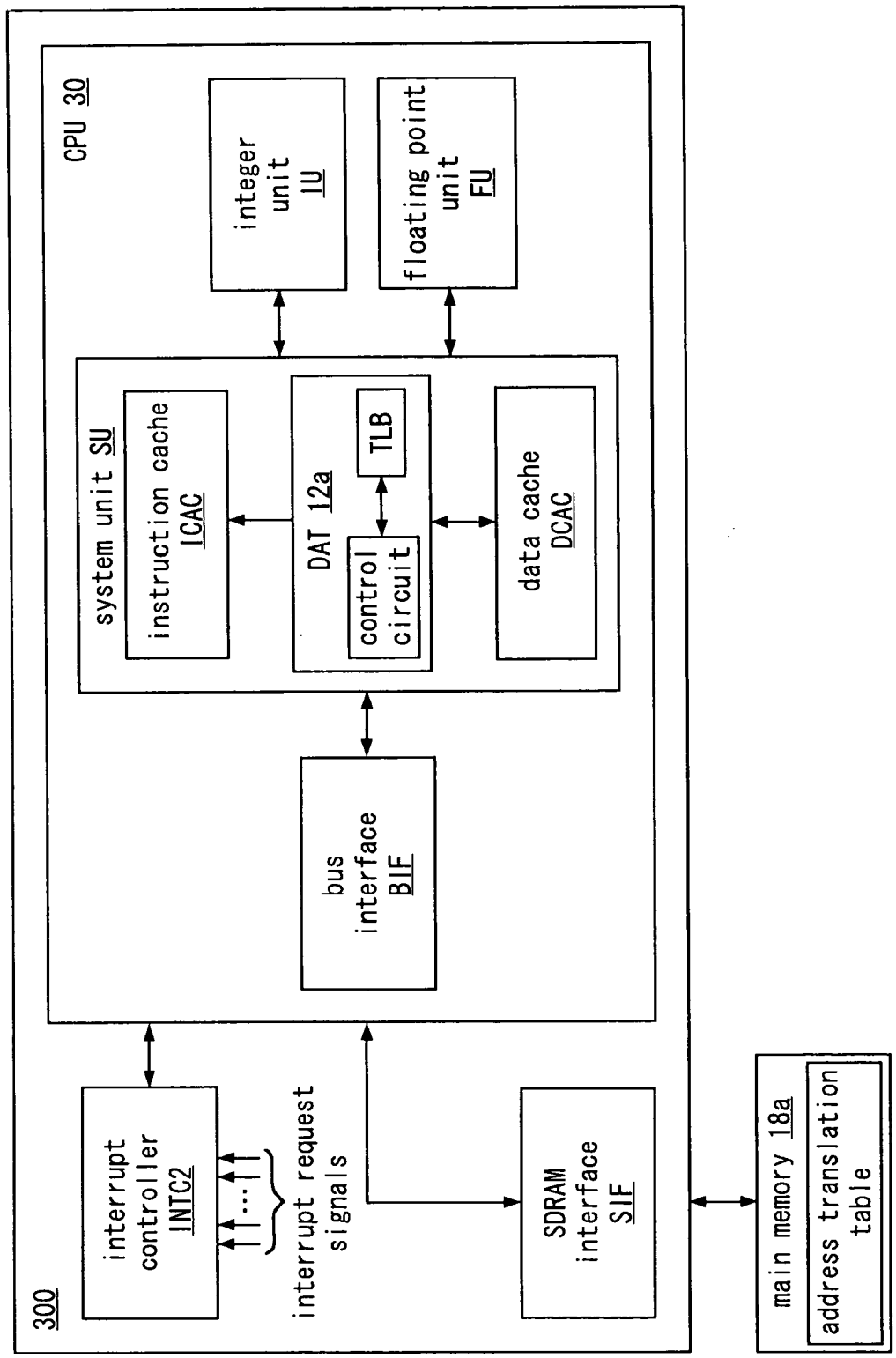
FIG. 6 is a block diagram showing a third embodiment of the microprocessor of the present invention.

FIG. 6 shows a third embodiment of the microprocessor of the present invention. The same reference numerals and symbols are used to designate the same elements as the elements explained in the second embodiment, and detailed explanation thereof will be omitted.

A microprocessor 300 has an interrupt controller INTC2 in place of the interrupt controller INTC1 of the second embodiment. The other configuration is the same as that of the microprocessor 200 of the second embodiment.

Figure 7:
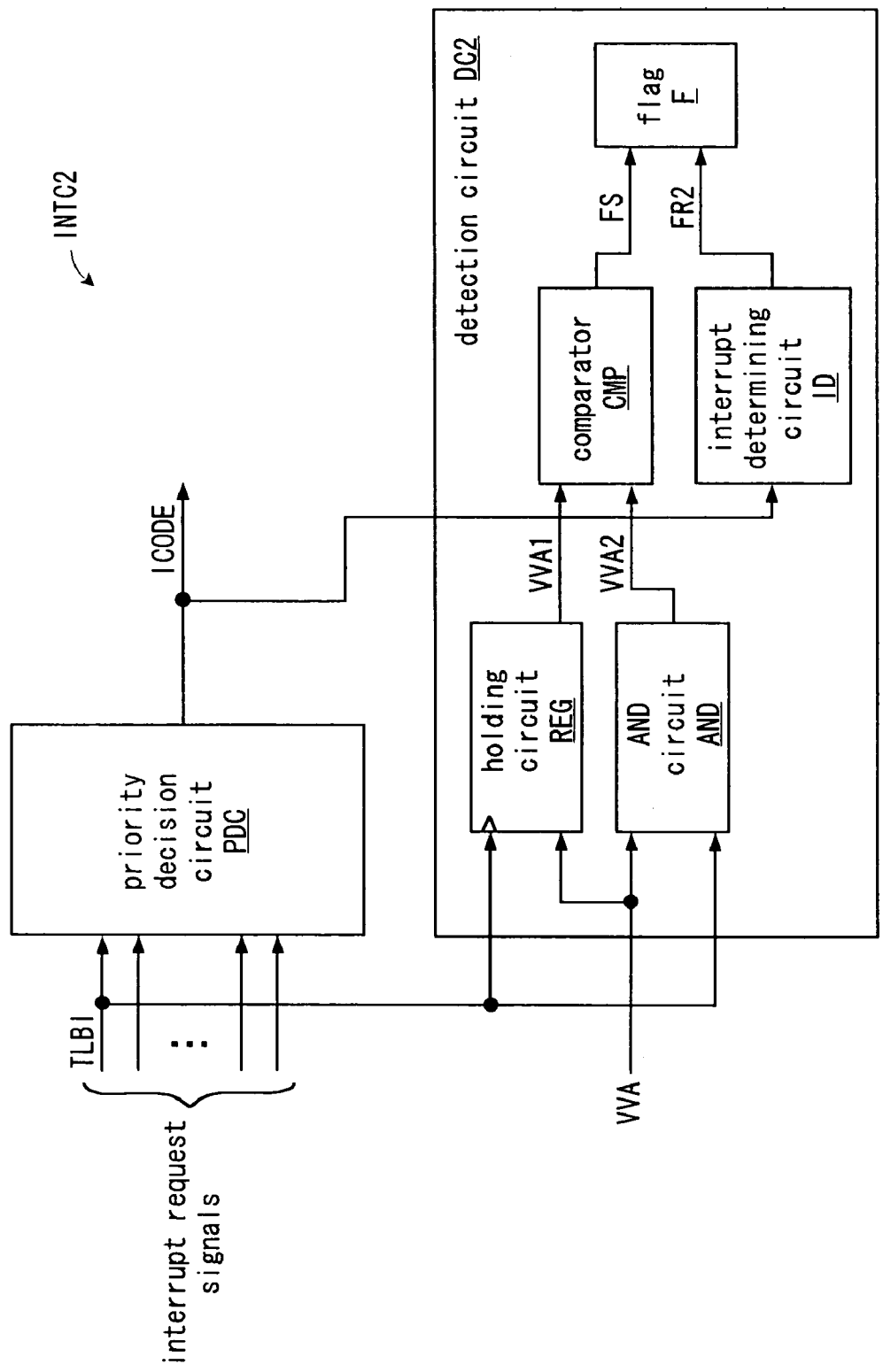
FIG. 7 is a block diagram showing an essential portion of an interrupt controller in the third embodiment.

FIG. 7 shows an essential portion of the interrupt controller INTC2 in the third embodiment.

The interrupt controller INTC2 has a detection circuit DC2 in place of the detection circuit DC1 of the second embodiment. The detection circuit DC2 has an interrupt determining circuit ID in place of the address detector AD of the second embodiment. The other configuration is the same as that of the interrupt controller INTC1 of the second embodiment.

The interrupt determining circuit ID detects the discrepancy between an interrupt code ICODE generated by a priority decision circuit PDC and an interrupt code corresponding to an interrupt request signal TLBI. When detecting the discrepancy of the interrupt codes (that an accepted interrupt request signal is not the interrupt request signal TLBI), the interrupt determining circuit ID outputs a flag reset signal FR2 which is a one-shot pulse signal.

A flag F is set to "1" in accordance with a rising edge of a flag set signal FS outputted from a comparator CMP. The flag F is reset to "0" in accordance with a rising edge of a flag reset signal FR2 outputted from the interrupt determining circuit ID. This operation makes it easier to identify the occurrence of the continuous entry substitution requests under the same VLIW instruction only by referring to the flag F. Further, the resetting of the flag F can re-validate the priority bit PB.

In the third embodiment described above, the same effects as those of the first and second embodiments are also obtainable Incidentally, the description is given in the first embodiment on the example where the TLB is constituted by the 2-way set associative method. The present invention is not to be limited to such an embodiment. For example, the TLB may be constituted by a 4-way associative method.

Figure 8:
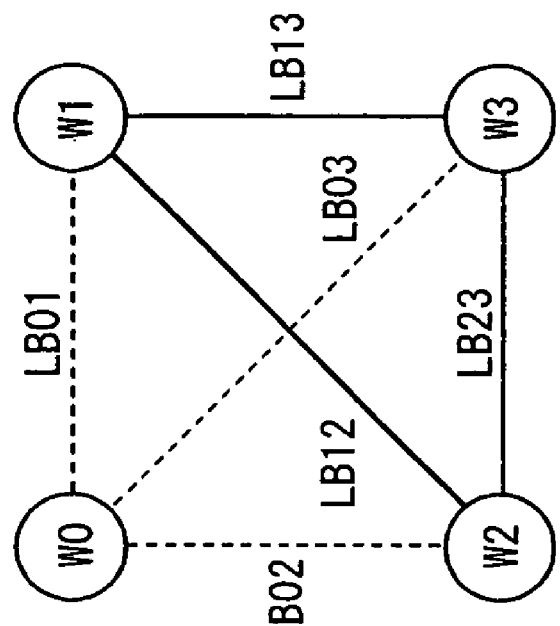
FIG. 8 is an explanatory view showing the choice of a subject of substitution in a 4-way set associative TLB.
Figure 8:
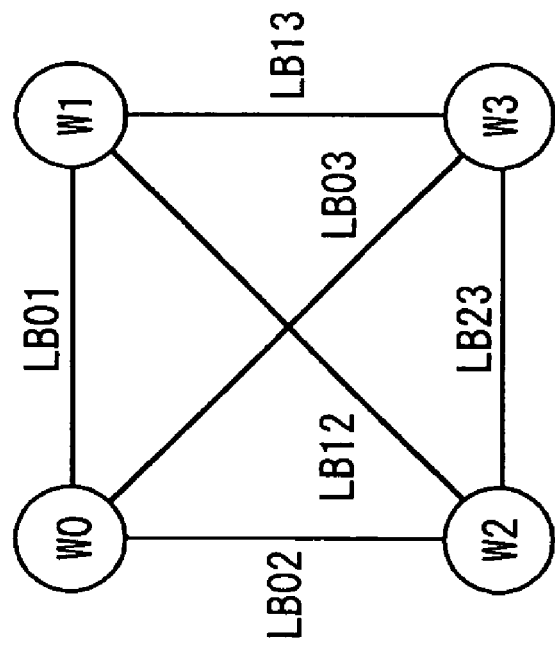

FIG. 8 shows the choice of a subject of substitution in a 4-way set associative TLB.

A TLB having four ways W0 to W3 has 6-bit LRU bits LB01, LB02, LB03, LB12, LB13, LB23 for each set. The LRU bit LB01 represents the relationship between an entry of the way W0 and an entry of the way W1. The value "1" of the LRU bit LB01 indicates that the entry of the way W1 is referred to less recently than the entry of the way W0. The value "0" of the LRU bit LB01 indicates that the entry of W0 is referred to less recently than the entry of the way W1. Similarly, the LRU bits LB02, LB03, LB12, LB13, LB23 represent the relationship between the entry of the way W0 and an entry of the way W2, the relationship between the entry of the way W0 and an entry of the way W3, the relationship between the entry W1 and the entry of the way W2, the relationship between the entry of the way W1 and the entry of the way W3, and the relationship between the entry of the way W2 and the entry of the way W3, respectively. The use of the LRU bits LB01, LB02, LB03, LB12, LB13, LB23 makes it possible to easily choose, as the subject of substitution, an entry least recently referred to in a set corresponding to a virtual address.

Further, for example, when only the priority bit PB of the entry of the way W0 is set in the set corresponding to the virtual address, only the LRU bits LB12, LB13, LB23 not relating to the entry of the way W0 is used, as shown on the right side of the drawing, so that the entry least recently referred to among the entries of the ways W1 to W3 can be easily chosen as the subject of substitution. Whereby, the entry of the way W0 can be excluded from candidates of the entry substitution. In the drawing, the LRU bits LB01, LB02, LB03 shown by the broken lines indicate that they are not used in the choice of the subject of substitution.

In the first embodiment, the example where the TLB is constituted by the set associative method is described. The present invention is not to be limited to such an embodiment. The TLB may be constituted by, for example, a full associative method.

The invention is not limited to the above embodiments and various modifications may be made without departing from the spirit and scope of the invention. Any improvement may be made in part or all of the components.

What is claimed is:

1. A microprocessor adopting a VLIW method in which a plurality of instructions contained in a single VLIW instruction are executed in parallel, comprising:
    a translation lookaside buffer having a plurality of entries in which address translation information is registered, the address translation information being obtained by translating a virtual address into a physical address, said translation lookaside buffer adopts a 2-way set associative method;
    a control circuit controlling said translation lookaside buffer; and
    a detection circuit detecting occurrence of continuous entry substitution requests under a single VLIW instruction, said control circuit chooses as a subject of entry substitution an entry that has been previously referred to, irrespective of states of the priority bits, when said detection circuit detects the occurrence of continuous entry substitution requests under a single VLIW instruction, wherein:
    each of the entries has a priority bit that is set when the registered address translation information is needed to be resident in the entries; and
    at the time an entry substitution request occurs while priority bits of all of the entries are in a set state, said control circuit chooses as a subject of entry substitution an entry that has been least recently referred to, irrespective of states of the priority bits, the entry substitution being for substituting the registered address information in the entries and at the time the entry substitution request occurs while a priority bit in at least one of the entries is in a reset state, said control circuit chooses as a subject of entry substitution an entry that has been least recently referred to from the at least one of the entries.

2. The microprocessor according to claim 1, wherein:
    said detection circuit has: a holding circuit holding a storage address of a VLIW instruction corresponding to a most recent entry substitution; a comparator comparing the address held in said holding circuit and a storage address of a VLIW instruction corresponding to a present entry substitution; and a flag that is set when said comparator detects a match of the two addresses; and
    when the flag is set at the time the entry substitution request occurs, said control circuit chooses as a subject of entry substitution an entry that has been previously referred to, irrespective of states of the priority bits.

3. The microprocessor according to claim 2, wherein said flag is reset in response to a transition of a storage address of a VLIW instruction.

4. The microprocessor according to claim 3, wherein:
    said detection circuit includes an address detector detecting a transition of a storage address of a VLIW instruction; and
    said flag is reset when said address detector detects a transition of a storage address of a VLIW instruction.

5. The microprocessor according to claim 2, further comprising
    an interrupt controller managing a plurality of interrupt requests which are issued for interrupting execution of a program, wherein
    said flag is reset in response to the interrupt controller's acceptance of an interrupt request not being an interrupt request for the entry substitution.

6. The microprocessor according to claim 5, wherein:
    said interrupt controller includes an interrupt determining circuit determining a factor of the accepted interrupt request; and
    said flag is reset when said interrupt determining circuit determines that the accepted interrupt request is not a request for the entry substitution.

* * * * *